United States Patent
Hong

(10) Patent No.: US 12,088,551 B2
(45) Date of Patent: Sep. 10, 2024

(54) NETWORK CONTROL METHOD AND NETWORK INTERFACE CARD

(71) Applicant: REALTEK SEMICONDUCTOR CORPORATION, Hsinchu (TW)

(72) Inventor: Yuan Hong, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/452,541

(22) Filed: Aug. 20, 2023

(65) Prior Publication Data

US 2024/0073179 A1 Feb. 29, 2024

(30) Foreign Application Priority Data

Aug. 24, 2022 (CN) .......................... 202211024071.6

(51) Int. Cl.
*H04L 61/5007* (2022.01)

(52) U.S. Cl.
CPC ............................... *H04L 61/5007* (2022.05)

(58) Field of Classification Search
CPC ........................... H04L 61/5007; H04L 69/22
USPC ....................................................... 709/227
See application file for complete search history.

(56) References Cited

U.S. PATENT DOCUMENTS

| 2012/0134266 A1* | 5/2012 | Roitshtein | H04L 47/125 370/230 |
| 2012/0163389 A1* | 6/2012 | Zhang | H04L 47/125 370/400 |
| 2013/0156036 A1* | 6/2013 | Basso | H04L 69/22 370/392 |
| 2015/0036513 A1* | 2/2015 | Bukin | H04L 47/2441 370/250 |
| 2017/0244637 A1* | 8/2017 | Singhal | H04L 45/7453 |

FOREIGN PATENT DOCUMENTS

CN 104917852 A * 9/2015 ......... H04L 61/6059

OTHER PUBLICATIONS

Liu, Machine translation of CN-104917852-A (Year: 2015).*

* cited by examiner

*Primary Examiner* — Ruolei Zong
(74) *Attorney, Agent, or Firm* — WPAT, P.C.; Anthony King

(57) ABSTRACT

A network control method is configured to balance the loading of a plurality of processes. The method includes obtaining an IP address of a packet; deleting a portion of bits of the IP address to generate a series according to an IP address entropy distribution; performing a hash function to the series to generate a hash value; performing a modulo operation to the hash value to obtain a remainder; and assigning the packet to a processor of the plurality of processes corresponding to the remainder.

20 Claims, 4 Drawing Sheets

NETWORK CONTROL METHOD AND NETWORK INTERFACE CARD

CROSS-REFERENCE TO RELATED APPLICATIONS

This application claims the benefit of priority to Patent Application No. 202211024071.6, filed in China on Aug. 24, 2022, which is incorporated by reference in its entirety.

TECHNICAL FIELD

The present disclosure relates to a network control method and network interface card, particularly, a network control method and a network interface card for balancing the load of a processor.

BACKGROUND

Currently, most computers have multiple processors to process network packets in parallel. With the advancement of technology, the number of network packets is constantly increasing. In order to maximize the performance of computers, how to balance the load of a processor has become an important issue in this field.

SUMMARY OF THE INVENTION

An aspect of the present disclosure provides a network control method configured to balance the loading of a plurality of processors. The network control method includes: obtaining an internet protocol (IP) address of a packet; deleting a portion of bits of the IP address according to an IP address entropy distribution to generate a series; performing a hash function to the series to generate a hash value; obtaining a remainder of the hash value according to a number of the plurality of processors; and assigning the packet to a processor of the plurality of processors corresponding the remainder.

Another aspect of the present disclosure provides a device including a transceiver circuit, a controller circuit, and a memory device. The transceiver circuit is configured to receive a packet. The memory device is configured to store a program code and an IP address entropy distribution, and enable the controller circuit to perform the following steps when the program code is performed: obtaining an IP address of the packet; according to the IP address entropy distribution, deleting a portion of bits of the IP address to generate a series; performing a hash function to the series to generate a hash value; obtaining a remainder of the hash value according to a number of a plurality of processors; and assigning the packet to one processor of the plurality of processors corresponding to the remainder.

Compared to conventional arts, the network control method and device of the present disclosure first deletes the less random bits from the IP address and then performs hashing based on the modified IP address. In this way, the packet distribution to the processor is improved and the load on the processor is balanced.

BRIEF DESCRIPTION OF THE DRAWINGS

Aspects of the present disclosure are best understood from the following detailed description when read with the accompanying drawings. It is noted that, in accordance with the common practice in the industry, various features are not drawn to scale. In fact, the dimensions of some features may be arbitrarily increased or reduced for clarity of discussion.

DETAILED DESCRIPTION

Figure 1:
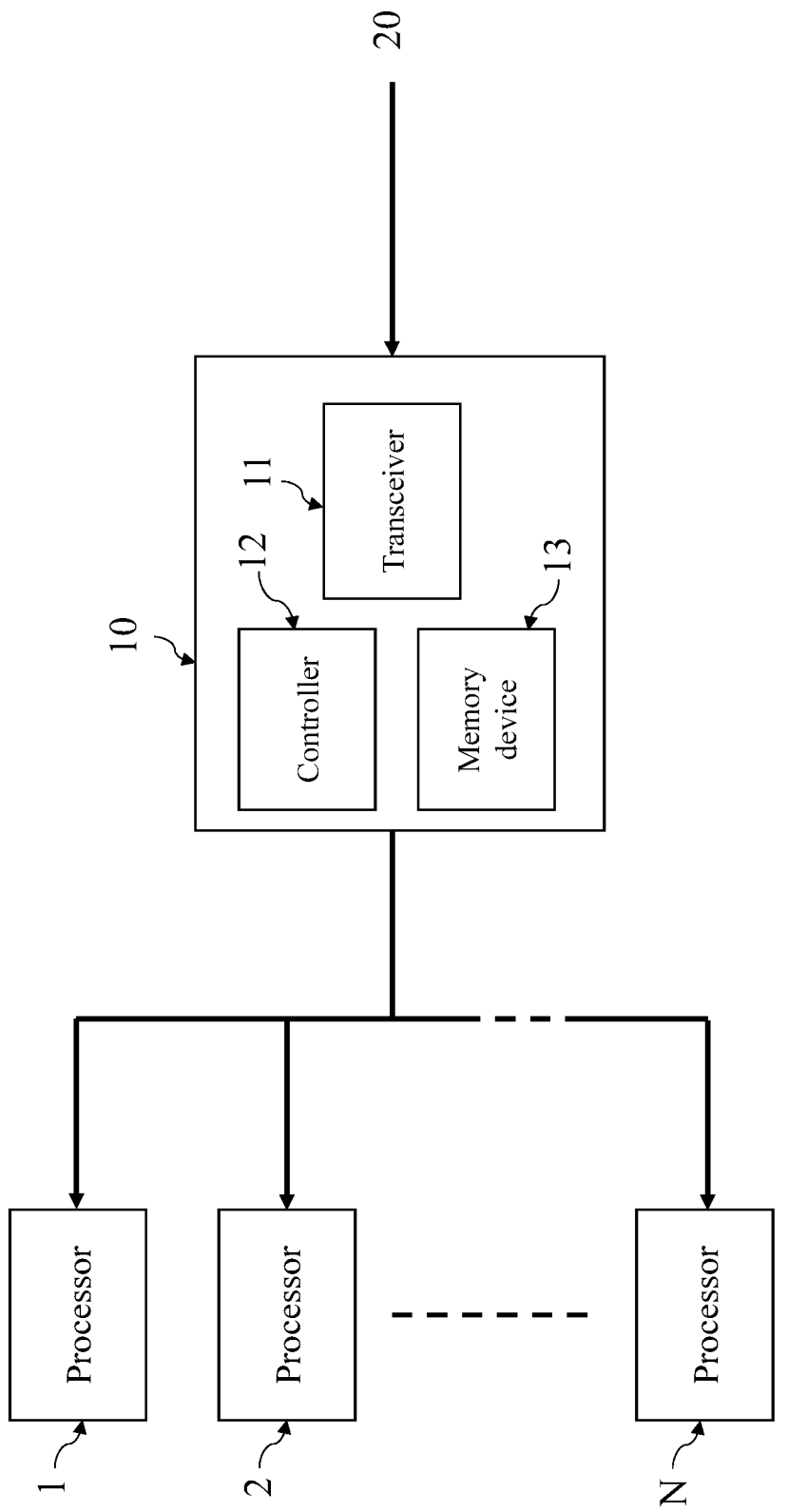
FIG. 1 is a schematic diagram illustrating a network interface card according to some embodiments of the present disclosure.

FIG. 1 is a schematic diagram illustrating a network interface card 10 according to some embodiments of the present disclosure. The network interface card 10 is configured to receive an internet packet 20 and assign the packet 20 to one of a plurality of processors. For ease of understanding, the plurality of processors are indicated as the processor 1 to the processor N. In some embodiments, N can be expressed by 2M, wherein M is a positive integer.

The network interface card 10 includes a transceiver 11, a controller 12 and a memory device 13. The transceiver 11 is configured to receive the packet 20. The memory device 13 is configured to store a program code. The controller 12 is configured to execute the program code to assign the packet 20 to one of the processors 1-N.

The packet 20 has an IP address. When executing the program code, the controller 12 is configured to obtain the IP address of the packet 20 and perform hash function according to the IP address to generate a hash value. Then, the controller 12 assigns the packet 20 to one of the processors 1-N according to the hash value.

Packets 20 from different sources have different IP addresses. Generally, performing hash function according to different IP addresses may result in different hash values. However, in some embodiments, even with different IP addresses, the randomness of those IP addresses may be very low in some of the fields of the IP address. For example, for IP addresses in the IPv6 format, different IP addresses may have the same common address prefix, which significantly reduces the randomness of the field. As a result, even hash values derived from hash function may have less ideal randomness.

When the randomness of the hash value is not ideal, the distribution of packets 20 to processors 1-N may not be evenly distributed. As a result, some processors are overloaded and others are idle for too long. In order to avoid the above situation, the network interface card 10 selects the fields with higher randomness in the IP address for hash function according to the IP address entropy distribution H. The details are described below.

Figure 2:
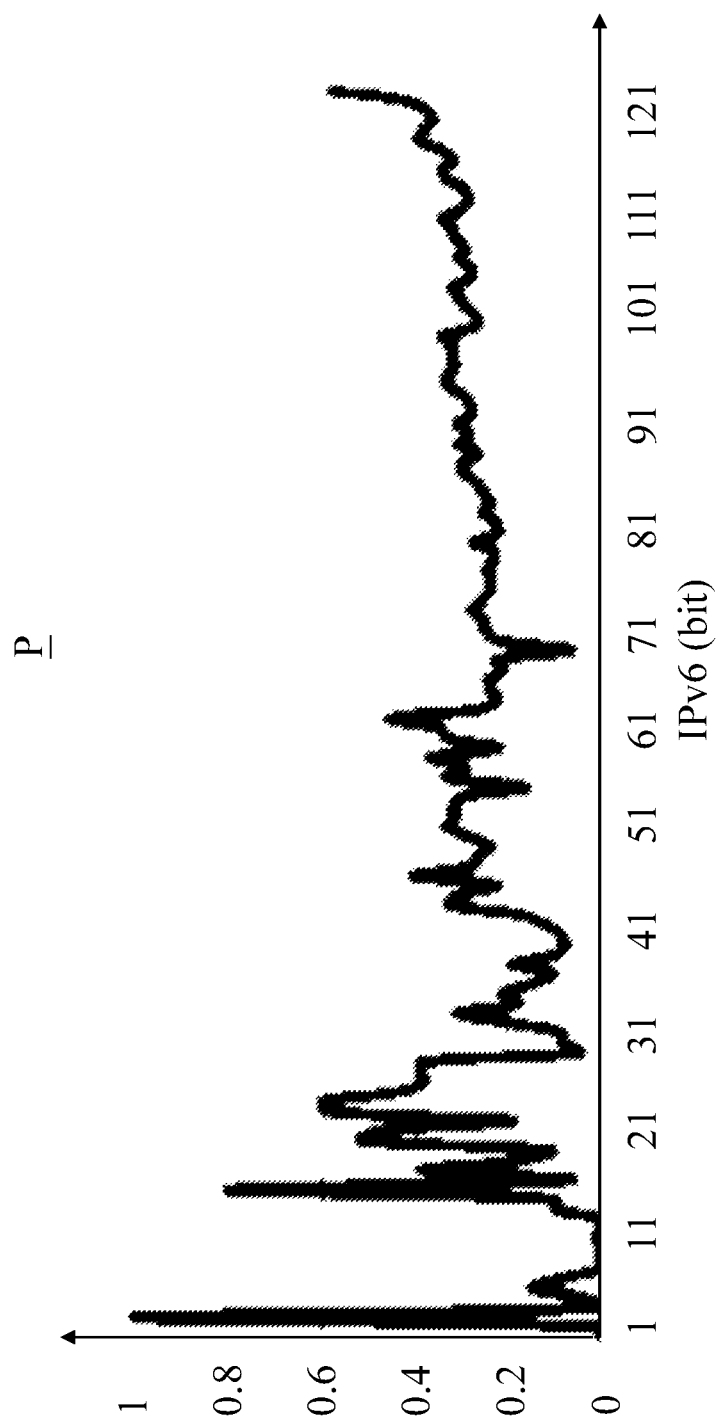
FIG. 2 is a schematic diagram illustrating an IP address bit probability according to some embodiments of the present disclosure.

Reference is made to FIG. 2. FIG. 2 is a schematic diagram illustrating the IP address bit probability P according to some embodiments of the present disclosure. The IP address bit probability P is explained with respect to the IPv6 format. However, as could be appreciated, the present disclosure is not limited to the IPv6 format, and the IP address of the packet 20 may be in the IPv6 or IPv4 format.

In some embodiments, the IP address bit probability P is a statistical distribution based on all possible existing IP addresses, where the vertical axis represents the probability of occurrence of 1 and the horizontal axis represents the $n^{th}$ bit of the IP address. As shown in FIG. 2, the probability of occurring 1 at some bits is almost 1, and the probability of occurring 0 at some bits is almost 1. Equation (1) converts the IP address bit probability P into the IP address entropy distribution H.

$$H=-[P \cdot \log_2 P+(1-P) \cdot \log_2(1-P)];\quad\quad\text{Equation (1).}$$

The IP address entropy distribution H represents the random rate (also explained as the randomness) of the corresponding bit (field) in the IP address after normalization. In the case of the lowest random rate, e.g., when the probability P of the occurring 1 in the second bit of the IP address is equal to 1 (or equal to 0), it is known from Equation (1) that the IP address entropy distribution H corresponding to the second bit is equal to 0. In contrast, in the case of maximum random rate, for example, when the probability P of occurring 1 in the $100^{th}$ bit of IP address is equal to 0.5, it is known from Equation (1) that the IP address entropy distribution H corresponding to the 100th bit is equal to 1.

Figure 3:
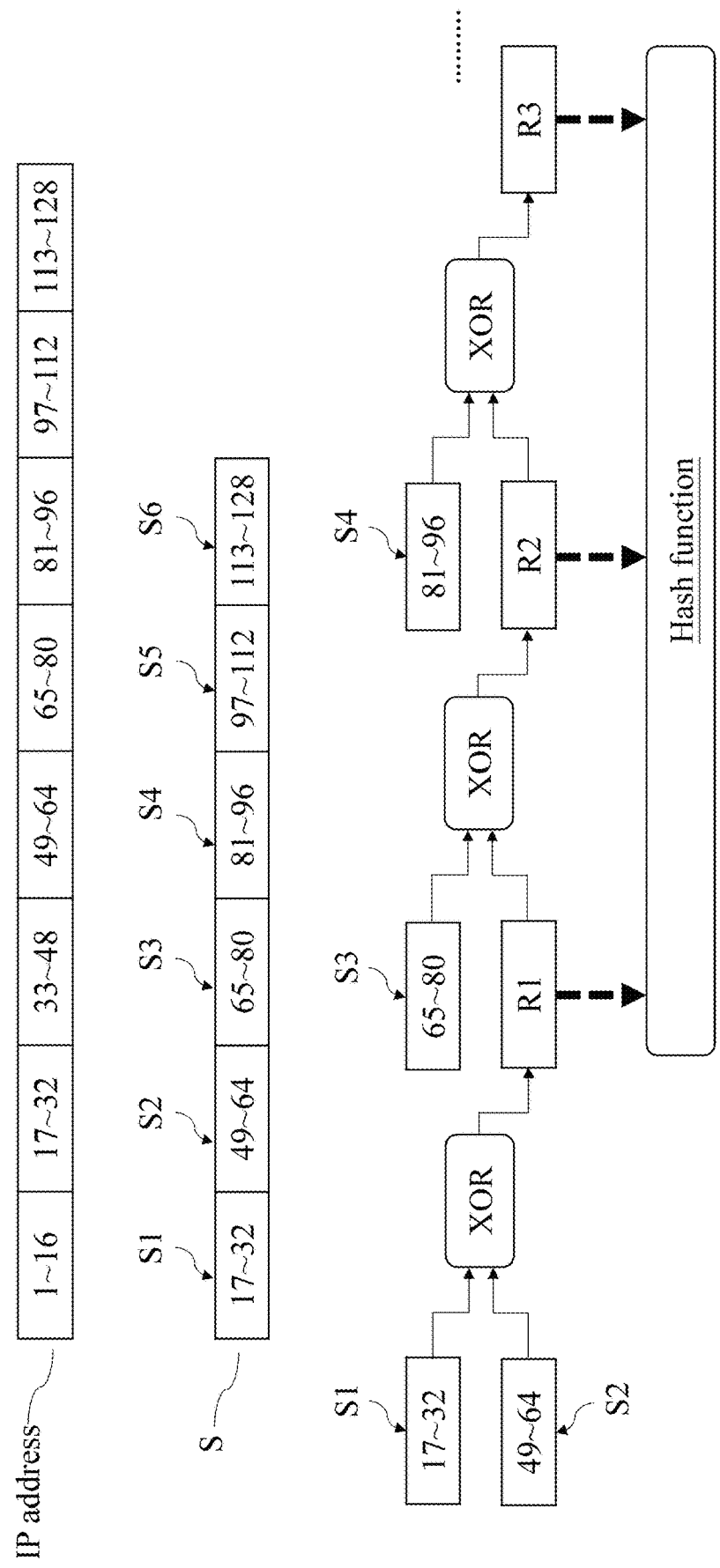
FIG. 3 is a schematic diagram illustrating an IP address operation according to some embodiments of the present disclosure.

Reference is made to FIG. 3. When executing the program code, the controller 12 deletes the bits of IP address whose IP address entropy distribution H is less than a pre-determined value and concatenates the remaining bits into a series S. In FIG. 3, for example, the IP address entropy distribution H of bits 1-16 and 33-48 of the IP address is less than the pre-determined value, the controller 12 deletes bits 1-16 and 33-48 of the IP address and concatenates the remaining bits 17-32, 49-64 and 65-128 into a series S. In some embodiments, the pre-determined value is approximately equal to 0.3

The controller 12 divides the series S into a plurality of segments. In some embodiments, each segment includes 16 bits. As shown in FIG. 3, the series S is divided into 6 segments S1-S6. Before performing the hash function, the controller 12 first performs exclusive OR (XOR) operation to the first segment S1 and the second segment S2 to generate a result R1. The controller 12 then performs hash function to the result R1 to generate a hash value.

The controller 12 assigns the packet 20 to one of the processors 1-N according to the hash value. Specifically, the controller 12 divides the hash value by N to obtain a remainder a (e.g., the remainder a is 3), and then assigns the packet 20 to the corresponding processors a (corresponding to the processors 3).

In some embodiments, the controller 12 further performs XOR operation to the result R1 and the third segment S3 to generate a result R2, performs XOR operation to the result R2 and the fourth segment S4 to generate a result R3, performs XOR operation to the result R3 and the fifth segment S5 to generate a result R4, and performs XOR operation to the result R4 and the sixth segment S6 generate a result R5. For the sake of brevity, some operations are not shown in FIG. 3.

In some embodiments, the controller 12 selects one of the results R1-R5 to perform the hash function to generate the hash value, determines which of the hash values obtained from the results R1-R5 have the greatest randomness, and finally assigns the packet 20 to one of the processors 1-N according to the hash value with the greatest randomness.

In some embodiments, before performing the XOR operation, the controller 12 is configured to determine whether each bit of the first segment S1 is independent from each other according to the IP address specification, i.e., determining whether any bits remain the same to each other in any case. When each bit of the first segment S1 is independent from each other, the controller 12 performs XOR operation. Conversely, when some bits of the first segment S1 are not independent from each other, the controller 12 retrieves a bit from another segment of the series S to replace it. For example, when the $X^{th}$ bit and the $Y^{th}$ bit of the first segment S1 are not independent from each other, the controller 12 retrieves one of the bits of the fifth segment S5 to replace the Yt h bit of the first segment S1. It should be understood that the above scenario is explained in terms of the first segment S1, and before performing the XOR operation, the controller 12 can be configured to determine separately whether the bits in each segment are independent from each other and decide whether to replace the bits that are not independent from each other with a bit from another segment.

In some embodiments, because the IP address entropy distribution H of the $81^{th}$-$128^{th}$ bits in the IP address are higher, when the bits in a segment are not independent from each other, one of the $81^{th}$-$128^{th}$ bits in the IP address is retrieved to replace the non-independent bit.

Figure 4:
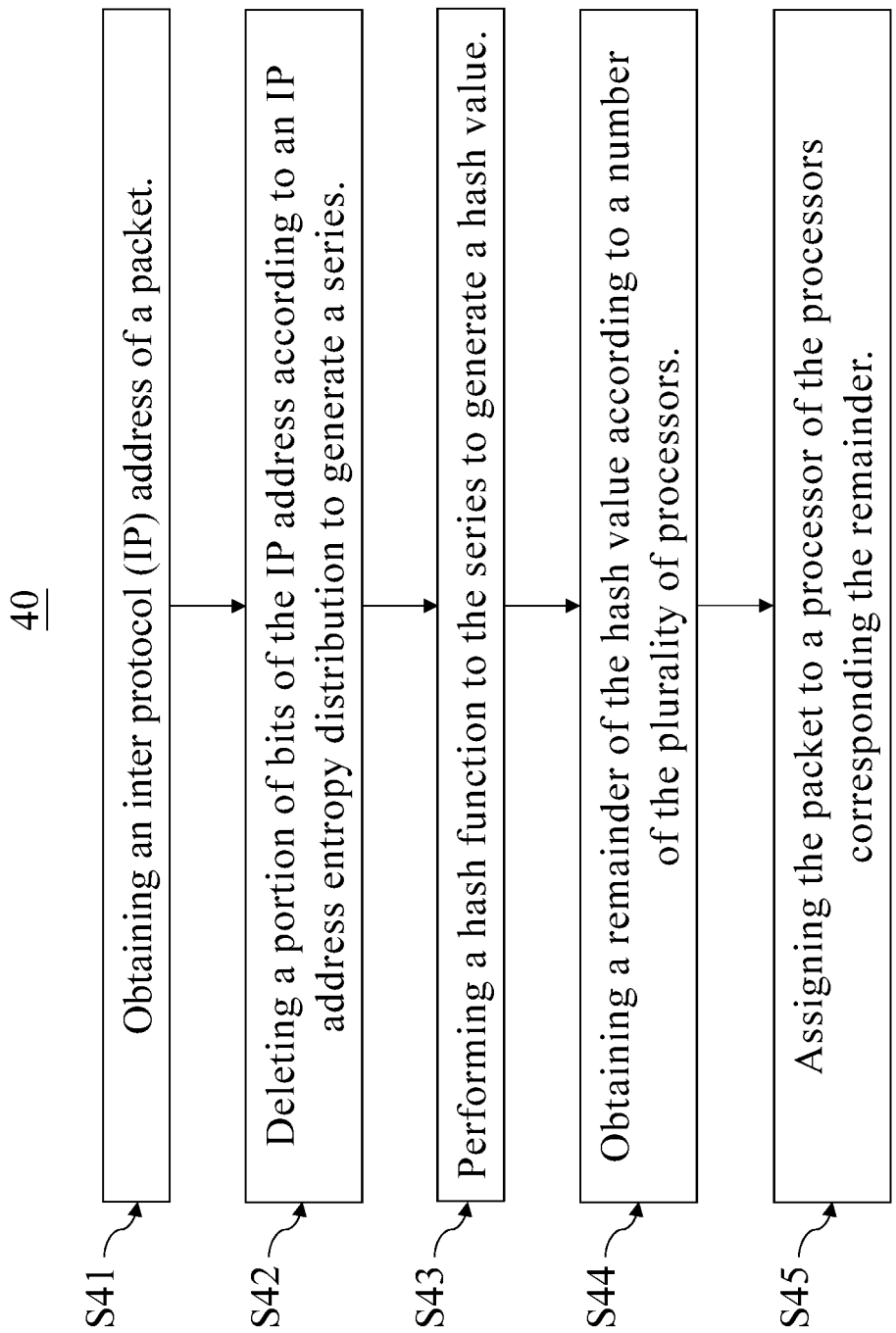
FIG. 4 is a flow chart of a network control method according to some embodiments of the present disclosure.

Reference is made to FIG. 4. FIG. 4 is a flow chart of a network control method 40 according to some embodiments of the present disclosure. In some embodiments, the network interface card 10 is configured to perform the network control method 40. For ease of understanding, the network control method 40 is discussed referencing to the reference numerals in FIG. 1 to FIG. 3. The network control method 40 includes Steps S41, S42, S43, S44 and S45.

In Step S41, the controller 12 obtains the IP address of the packet 20. In Step S42, the controller 12 deletes a portion of bits in the IP address according to the IP address entropy distribution H to generate the series S. In Step S43, the controller 12 performs hash function to the series S to generate a hash value. In Step S44, the controller 12 obtains a remainder from the hash value according to a number N of the processors. In Step S45, the controller 12 assigns the packet 20 to one of the processor of the processors 1-N corresponding to the remainder.

The present disclosure is not limited to the foregoing network control method 40; each operation used in FIG. 1 to FIG. 3 are within the contemplated scope of the network control method 40.

The foregoing outlines features of several embodiments so that those skilled in the art may better understand various aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A network control method, configured to balance the loading of a plurality of processors, comprising:
   obtaining an internet protocol (IP) address of a packet;
   deleting a portion of bits of the IP address according to an IP address entropy distribution to generate a series;
   performing a hash function to the series to generate a hash value;
   obtaining a remainder of the hash value according to a number of the plurality of processors; and
   assigning the packet to a processor of the plurality of processors corresponding the remainder.

2. The network control method of claim 1, wherein the IP address is in an IPv6 format.

3. The network control method of claim 1, wherein the IP address entropy distribution corresponds to an entropy of each bit of the IP address, wherein the step of deleting the portion of bits of the IP address according to the IP address entropy distribution to generate the series comprises:
  deleting the portion of bits, wherein the entropy of the portion of bits is less than a pre-determined value; and
  concatenating the remaining bits of the IP address to generate the series.

4. The network control method of claim 3, wherein the pre-determined value is approximately 0.3.

5. The network control method of claim 3, wherein the step of performing the hash function to the series to generate the hash value comprises:
  dividing the series into a plurality of segments;
  performing an exclusive OR operation to a first segment and a second segment of the plurality of segments to generate a first result; and
  performing the hash function according to the first result to generate the hash value.

6. The network control method of claim 5, wherein the step of performing the hash function to the series to generate the hash value further comprises:
  performing the exclusive OR operation on the first result and a third segment of the plurality of segments to generate a second result,
  wherein the step of performing the hash function according to the first result to generate the hash value is furthered performed according to the second result.

7. The network control method of claim 5, wherein each of the plurality of segments has 16 bits.

8. The network control method of claim 5, wherein the step of performing the hash function to the series to generate the hash value further comprises:
  before performing the exclusive OR operation to the first segment and the second segment, determining whether each bit of the first segment is independent from each other according to a specification of the IP address; and
  when an $X^{th}$ bit and a $Y^{th}$ bit of the first segment are not independent from each other, obtaining a compensation bit from the deleted portion of bits to replace the $Y^{th}$ bit to update the first segment.

9. The network control method of claim 8, wherein the compensation bit is between the $81^{th}$ bit to the $128^{th}$ bit of the IP address.

10. The network control method of claim 9, wherein when each bit of the first segment is independent from each other, performing the exclusive OR operation to the first segment and the second segment of the plurality of segments to generate the first result.

11. A device, comprising:
  a transceiver circuit, configured to receive a packet;
  a controller circuit; and
  a memory device, configured to store a program code and an IP address entropy distribution, and enable the controller circuit to perform the following steps when the program code is performed:
    obtaining an IP address of the packet;
    according to the IP address entropy distribution, deleting a portion of bits of the IP address to generate a series;
    performing a hash function to the series to generate a hash value;
    obtaining a remainder of the hash value according to a number of a plurality of processors; and
    assigning the packet to one processor of the plurality of processors corresponding to the remainder.

12. The device of claim 11, wherein the IP address is in an IPv6 format.

13. The device of claim 11, wherein the IP address entropy distribution corresponds to an entropy of each bit of the IP address, wherein the step of deleting the portion of bits of the IP address according to the IP address entropy distribution to generate the series comprises:
  deleting the portion of bits, wherein the entropy of the portion of bits is less than a pre-determined value; and
  concatenating the remaining bits of the IP address to generate the series.

14. The device of claim 13, wherein the pre-determined value is approximately 0.3.

15. The device of claim 14, wherein the step of performing the hash function to the series to generate the hash value comprises:
  dividing the series into a plurality of segments;
  performing an exclusive OR operation to a first segment and a second segment of the plurality of segments to generate a first result; and
  performing the hash function according to the first result to generate the hash value.

16. The device of claim 15, wherein the step of performing the hash function to the series to generate the hash value further comprises:
  performing the exclusive OR operation to the first result and a third segment of the plurality of segments to generate a second result,
  wherein the step of performing the hash function according to the first result to generate the hash value is furthered performed according to the second result.

17. The device of claim 15, wherein each of the plurality of segments has 16 bits.

18. The device of claim 15, wherein the step of performing the hash function to the series to generate the hash value further comprises:
  before performing the exclusive OR operation to the first segment and the second segment, determining whether each bit of the first segment is independent from each other according to a specification of the IP address; and
  when an $X^{th}$ bit and a $Y^{th}$ bit of the first segment are not independent from each other, obtaining a compensation bit from the deleted portion of bits to replace the $Y^{th}$ bit to update the first segment.

19. The device of claim 18, wherein the compensation bit is between the $81^{th}$ bit to the $128^{th}$ bit of the IP address.

20. The device of claim 19, when each bit of the first segment is independent from each other, performing the exclusive OR operation to the first segment and the second segment of the plurality of segments to generate the first result.

* * * * *